US012609325B2

(12) United States Patent　(10) Patent No.: US 12,609,325 B2
Oshikawa et al.　(45) Date of Patent:　Apr. 21, 2026

(54) TRANSFER SHEET, TRANSFER METHOD AND METHOD FOR MANUFACTURING MEMBRANE ELECTRODE ASSEMBLY

(71) Applicant: Robert Bosch GmbH, Stuttgart (DE)

(72) Inventors: Katsuhiko Oshikawa, Tokyo (JP); Shogo Takamuku, Tokyo (JP)

(73) Assignee: Robert Bosch GmbH, Stuttgart (DE)

( * ) Notice: Subject to any disclaimer, the term of this patent is extended or adjusted under 35 U.S.C. 154(b) by 664 days.

(21) Appl. No.: 17/801,316

(22) PCT Filed: Feb. 4, 2021

(86) PCT No.: PCT/IB2021/050890
　§ 371 (c)(1),
　(2) Date: Aug. 22, 2022

(87) PCT Pub. No.: WO2021/171114
　PCT Pub. Date: Sep. 2, 2021

(65) Prior Publication Data
　US 2023/0352696 A1　Nov. 2, 2023

(30) Foreign Application Priority Data

Feb. 24, 2020　(JP) ................................ 2020-028905

(51) Int. Cl.
　H01M 4/88　(2006.01)
　H01M 8/1004　(2016.01)
(52) U.S. Cl.
　CPC ....... H01M 4/8875 (2013.01); H01M 4/8814 (2013.01); H01M 8/1004 (2013.01)

(58) Field of Classification Search
　CPC . H01M 4/8814; H01M 4/8875; H01M 8/1004
　See application file for complete search history.

(56) References Cited

U.S. PATENT DOCUMENTS

2002/0106501 A1* 8/2002 Debe ...................... C01B 13/02
　428/305.5
2011/0008707 A1 1/2011 Muraoka et al.
2017/0244125 A1* 8/2017 Takahashi ................ B01J 35/60

FOREIGN PATENT DOCUMENTS

| EP | 0958628 A1 | 11/1999 |
| JP | H09169165 A | 6/1997 |
| JP | H10-125929 | * 5/1998 |
| JP | H10125929 A | 5/1998 |
| JP | 2010021023 A | 1/2010 |
| JP | 2010-225421 | * 10/2010 |
| JP | 2010225421 A | 10/2010 |

(Continued)

OTHER PUBLICATIONS

English translation of JP Publication H10-125929, May 1998.*

(Continued)

*Primary Examiner* — Brittany L Raymond
(74) *Attorney, Agent, or Firm* — Michael Best & Friedrich LLP

(57)　ABSTRACT

To improve peelability of a base sheet regardless of a type of the base sheet.
A transfer sheet (50A, 50B) in which a transfer layer (52) is laminated on a base sheet (51) includes a plurality of gas occlusion bodies (60) in a surface of or inside the transfer layer (52). The gas occlusion bodies (60) store gas therein and release the stored gas when energy is applied.

9 Claims, 5 Drawing Sheets

(56) References Cited

FOREIGN PATENT DOCUMENTS

| | | | |
|---|---|---|---|
| JP | 2017177679 | A | 10/2017 |
| JP | 2019179625 | A | 10/2019 |

OTHER PUBLICATIONS

English translation of JP Publication 2010-225421, Oct. 2010.*
International Search Report and Written Opinion for Application
No. PCT/IB2021/050890 dated Apr. 16, 2021 (8 pages).

\* cited by examiner

[FIG. 1]
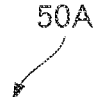
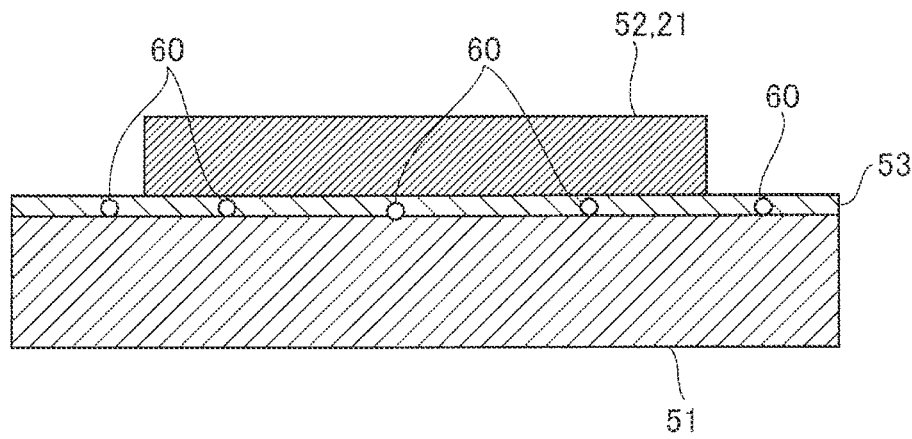
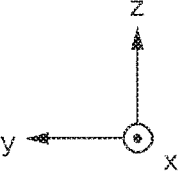

[FIG. 2]
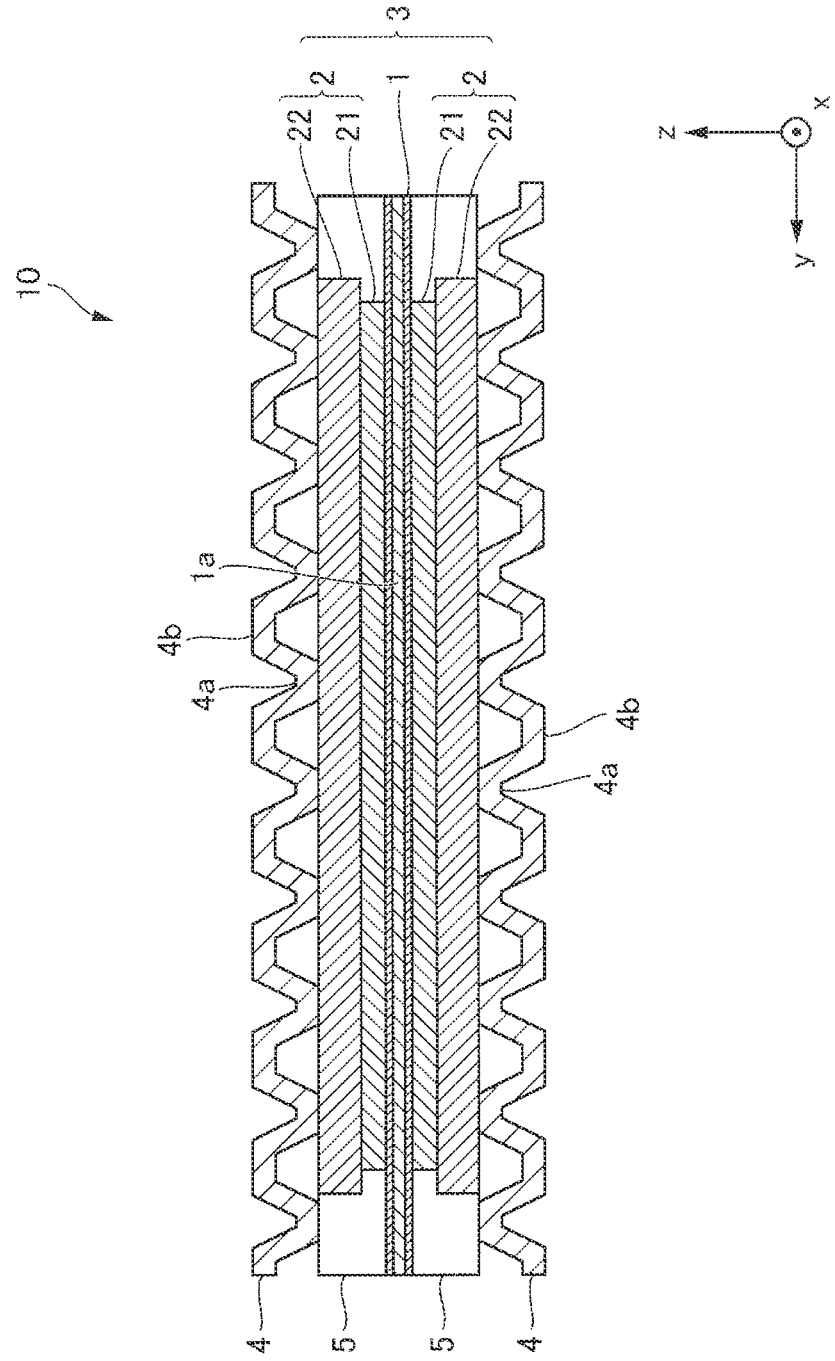

[FIG. 3]
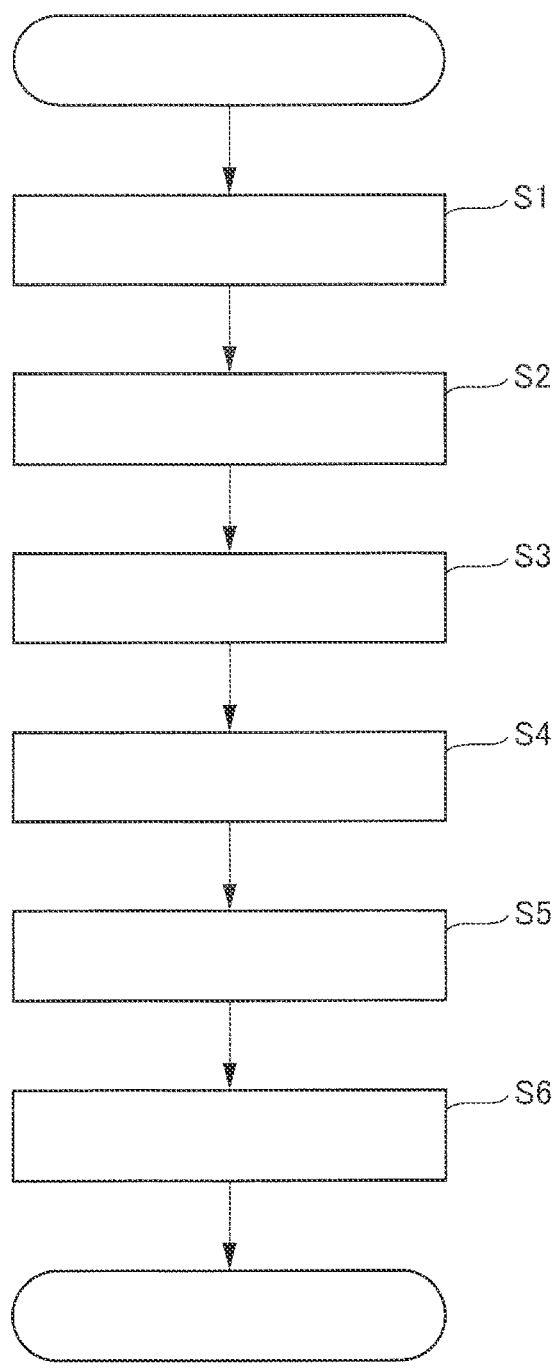

[FIG. 4]
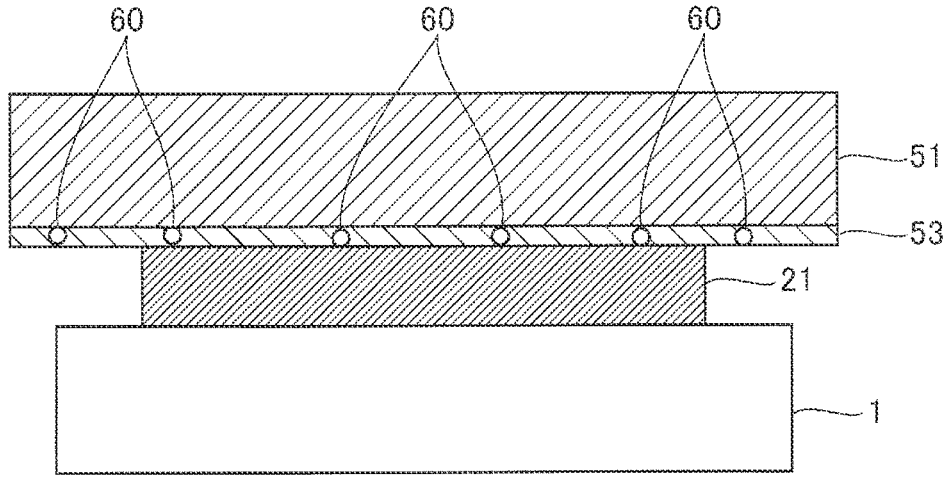
[FIG. 5]
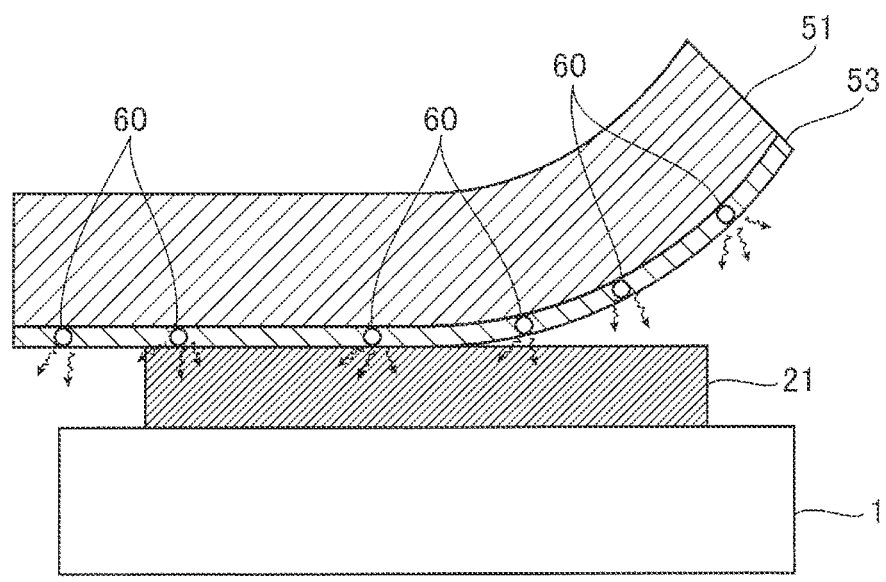

[FIG. 6]
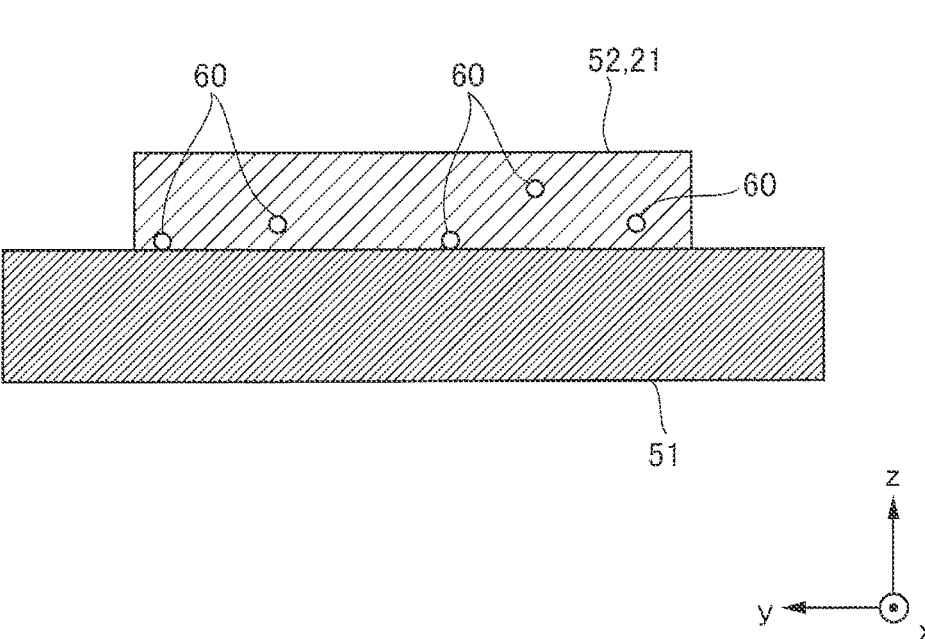

TRANSFER SHEET, TRANSFER METHOD AND METHOD FOR MANUFACTURING MEMBRANE ELECTRODE ASSEMBLY

BACKGROUND OF THE INVENTION

The present invention relates to a transfer sheet, a transfer method, and a method for manufacturing a membrane electrode assembly.

A membrane electrode assembly used in a solid polymer fuel cell has a structure in which a pair of electrodes are disposed to both sides of an electrolyte membrane. The electrode includes a catalyst layer that promotes a chemical reaction of fuel gas.

As a method for manufacturing a membrane electrode assembly, a method has been proposed in which a catalyst layer is formed on a base sheet by applying an ink containing a material for the catalyst layer, and the catalyst layer is transferred from this base sheet onto an electrolyte membrane (for example, see JP-A-2019-179625).

A resin film is used as the base sheet. In order to improve transferability or peelability, the resin film has been improved by, for example, adjusting a physical property or forming a release layer (for example, see JP-A-2017-177679).

SUMMARY OF THE INVENTION

Generally, an appropriate resin film is selected as the base sheet from a viewpoint of formability of the catalyst layer, the peelability of the base sheet, and the like. Even in this case, the peelability of the base sheet may be insufficient and defects such as cracks and holes may occur in the catalyst layer.

An object of the invention is to improve peelability of a base sheet regardless of a type of the base sheet.

A transfer sheet (50A, 50B) according to an aspect of the invention is the transfer sheet (50A, 50B) in which a transfer layer (52) is laminated on a base sheet (51), the transfer sheet including a plurality of gas occlusion bodies (60) on a surface of or inside the transfer layer (52). The gas occlusion bodies (60) store gas and release the stored gas when energy is applied.

A transfer method according to another aspect of the invention is a method for transferring, from the transfer sheet (50A, 50B) in which the transfer layer (52) is laminated on the base sheet (51), the transfer layer (52) to an object to be transferred, the transfer method including a step of bringing the transfer sheet (50A, 50B) into contact with the object to be transferred to transfer the transfer layer (52), and a step of peeling the base sheet (51) from the object to be transferred. The transfer sheet (50A, 50B) includes the plurality of gas occlusion bodies (60) that store gas on a surface of or inside the transfer layer (52). The transfer method further includes a step of applying energy to the gas occlusion bodies (60) before or during the peeling of the base sheet (51), so that the gas is released from the gas occlusion bodies (60).

A method for manufacturing a membrane electrode assembly (3) according to another aspect of the invention is a method for manufacturing the membrane electrode assembly (3) including electrodes (2) with catalyst layers (21) and an electrolyte membrane (1) with the electrodes (2) being disposed on both sides thereof, the method including a step of bringing the transfer sheet (50A, 50B) in which the catalyst layer (21) is laminated on the base sheet (51) into contact with the electrolyte membrane (1) to transfer the catalyst layer (21), and a step of peeling off the base sheet (51) from the catalyst layer (21). The transfer sheet (50A, 50B) includes the plurality of gas occlusion bodies (60) that store gas on a surface of or inside of the catalyst layer (21). The method further includes a step of applying energy to the gas occlusion bodies (60) before or during the peeling of the base sheet (51), so that the gas is released from the gas occlusion bodies (60).

According to the invention, peelability of the base sheet can be improved regardless of a type of the base sheet.

BRIEF DESCRIPTION OF THE DRAWINGS

FIG. 1 is a cross-sectional view showing a configuration of a transfer sheet of an embodiment.

FIG. 2 is a cross-sectional view showing a configuration of a fuel cell.

FIG. 3 is a flowchart showing a procedure of a processing in which a catalyst layer is provided to an electrolyte membrane.

FIG. 4 is a partial cross-sectional view showing the transfer sheet in contact with the electrolyte membrane.

FIG. 5 is a partial cross-sectional view showing a base sheet to be peeled off from the electrolyte membrane.

FIG. 6 is a cross-sectional view showing a configuration of a transfer sheet according to another embodiment.

DETAILED DESCRIPTION

Hereinafter, embodiments of a transfer sheet, a transfer method, and a method for manufacturing a membrane electrode assembly of the invention will be described with reference to the drawings. A configuration to be described below is an example (a typical example) of the invention and is not limited to this configuration.

FIG. 1 shows a configuration example of a transfer sheet 50A according to an embodiment of the invention.

As shown in FIG. 1, the transfer sheet 50A includes a base sheet 51 and a transfer layer 52 on the base sheet 51. By bringing the transfer layer 52 of the transfer sheet 50A into contact with an object to be transferred and transferring the transfer layer 52, the transfer layer 52 can be laminated on the object to be transferred. In the drawings, a z direction represents a laminating direction. An x direction and a y direction are directions orthogonal to each other in a plane orthogonal to the z direction.

The base sheet 51 is preferably a resin film because it is easy to match a shape of the object to be transferred. Examples of a resin material include a fluorine-based resin such as polytetrafluoroethylene (PTFE) and polyvinylidene fluoride (PVDF), a thermoplastic resin, and the like. Examples of the thermoplastic resin include a polyethylene-based resin such as high-density polyethylene and medium-density polyethylene, a propylene resin such as polypropylene, a polyolefin resin such as cycloolefin copolymers, a polyamide resin such as nylon-6, a polyester-based resin such as polyethylene terephthalate, polyethylene naphthalate, and aliphatic polyesters, and a styrene-based resin such as a styrene-acrylonitrile resin.

The transfer layer 52 is laminated on the base sheet 51. The transfer layer 52 can be laminated by applying an ink containing a material for the transfer layer 52 on the base sheet 51 and drying the ink if necessary.

(Gas Occlusion Body)

The transfer sheet 50A includes a plurality of gas occlusion bodies 60 on a surface of the transfer layer 52.

The gas occlusion bodies 60 store gas and release the stored gas when energy is applied. The energy for releasing the gas can be applied by, for example, infrared irradiation, heating, and the like.

By releasing the gas from the gas occlusion bodies 60, the base sheet 51 and the transfer layer 52 can be separated from each other. Therefore, the base sheet 51 can be easily peeled off with a small peeling force. On the other hand, since the gas is gradually released, the gas does not impose a strong load on the transfer layer 52. Therefore, occurrence of defects such as cracks and holes in the transfer layer 52 can be reduced.

In the present embodiment, the plurality of gas occlusion bodies 60 are disposed by applying the ink containing the gas occlusion bodies 60 and a solvent on the base sheet 51. Specifically, the gas occlusion bodies 60 are disposed in a surface layer 53 formed by applying. From a viewpoint of fixing positions of the gas occlusion bodies 60, the ink can contain a binder resin. Further, from a viewpoint of uniformly dispersing the gas occlusion bodies 60 in an in-plane direction (x-y plane) of the transfer layer 52, the ink can contain a dispersant.

A thickness of the surface layer 53 can be set to a degree such that the gas occlusion bodies 60 are covered. With such a thickness, the gas occlusion bodies 60 are fixed to a surface of the base sheet 51 and the gas release is not disturbed. The thickness of the surface layer 53 can be adjusted based on, for example, application amount ($g/m^2$) and a viscosity of the ink.

The gas stored in the gas occlusion bodies 60 is not particularly limited, and may be, for example, air, hydrogen gas, nitrogen gas, and oxygen gas. From a viewpoint of safety, inert gas such as nitrogen gas may be used instead of combustible gas. The gas stored in the gas occlusion bodies 60 can be selected, for example, based on the size of pores thereof in a case of a porous glass bead. The smaller the pores are, the smaller a molecular weight of the gas that can be stored in the pores are.

As the gas occlusion bodies 60, for example, the porous glass bead, a gas occlusion alloy, and the like can be used. From a viewpoint of reducing an influence on a physical property such as conductivity of the object to be transferred, the porous glass bead is preferable, and from a viewpoint of formability of the pores, a borosilicate glass bead is more preferable. Particularly, an iron oxide ($Fe_3O_4$)-doped borosilicate glass bead is suitable for storing the hydrogen gas.

The porous glass bead storing the hydrogen gas can be formed by heating a glass frit such as borosilicate or alumina borosilicate with addition of 0.1 to 10% by mass of iron oxide as required, and rapidly cooling the glass frit in a hydrogen atmosphere in a state of being melted at a temperature of 500 to 700° C. so as to form into a particulate shape. For the porous glass bead storing the hydrogen gas, for example, Douglas B. Rapp, James E .Shelby, "Photo-Induced Hydrogen outgassing of glass, Journal of Non Crystalline Solids", 349(2004)pp. 254-259, and the like can be referred to.

The size of the gas occlusion body 60 may be set depending on an occlusion amount of the gas, and in a case of the porous glass bead, a particle size thereof may be, for example, 0.1 to 1000 μm.

A blending amount of the gas occlusion body 60 may be determined according to a gas occlusion amount of the gas occlusion body 60 and an area of the transfer layer 52. Depending on environmental conditions such as a temperature or a pressure, for example, in a case where the gas occlusion body 60 of 1 $cm^3$ can store 1000 times a volume of gas, when ⅒ or more of the gas occlusion bodies 60 are disposed with respect to the transfer layer 52 having a unit area of 10 cm×10 cm, the transfer layer 52 can be sufficiently peeled off from the base sheet 51.

From a viewpoint of uniformly releasing the gas in the in-plane direction (x-y plane) of the transfer layer 52, it is preferable that the plurality of gas occlusion bodies 60 are dispersedly disposed at different positions in the in-plane direction.

(Fuel Cell)

The transfer sheet can be used for manufacturing the membrane electrode assembly (MEA) of a fuel cell.

FIG. 2 shows a configuration example of a fuel cell 10 according to the embodiment.

As shown in FIG. 2, the fuel cell 10 includes an MEA 3, a pair of separators 4 and a pair of sub-gaskets 5. The MEA 3 includes an electrolyte membrane 1 and a pair of electrodes 2. The electrodes 2 and the separators 4 are laminated on both sides of the electrolyte membrane 1. In the drawings, the z direction represents the laminating direction. The x direction and the y direction are directions orthogonal to each other in the plane orthogonal to the z direction.

The electrolyte membrane 1 is an ionic conductive polymer electrolyte membrane. The electrolyte membrane 1 includes, for example, a perfluorosulfonic acid polymer such as Nafion (registered trademark) and Aquivion (registered trademark), an aromatic polymer such as sulfonated polyetheretherketone (SPEEK) and sulfonated polyimide, an aliphatic polymer such as polyvinyl sulfonic acid and polyvinyl phosphoric acid.

The electrolyte membrane 1 may be a composite membrane obtained by impregnating a porous base material 1a with a polymer electrolyte from a viewpoint of improving durability. The porous base material 1a is not particularly limited as long as it can support the polymer electrolyte, and a porous, woven fabric-like, non-woven fabric-like, or fibril-like membrane can be used, for example. A material for the porous base material 1a is not particularly limited, and the polymer electrolyte as described above can be used from a viewpoint of enhancing ionic conductivity. Among the materials, a fluoropolymer such as polytetrafluoroethylene, a polytetrafluoroethylene-chlorotrifluoroethylene copolymer, and polychlorotrifluoroethylene is excellent in strength and shape stability.

In the pair of electrodes 2, one of the electrodes 2 is an anode and is also called a fuel electrode. The other electrode 2 is a cathode and is also called an air electrode. As the fuel gas, the hydrogen gas is supplied to the anode and air containing oxygen gas is supplied to the cathode.

At the anode, the hydrogen gas ($H_2$) is supplied, and a reaction of producing electrons (e−) and protons (H+) from the hydrogen gas ($H_2$) occurs. The electrons move to the cathode via an external circuit (not shown). The movement of electrons generates a current in the external circuit. The protons move to the cathode via the electrolyte membrane 1.

The oxygen gas ($O_2$) is supplied to the cathode, and oxygen ions ($O_2$−) are generated by the electrons moving from the external circuit. The oxygen ions combine with the protons (2H+) moved from the electrolyte membrane 1 to become water ($H_2O$).

The electrode 2 includes a catalyst layer 21. The electrode 2 of the present embodiment further includes a gas diffusion layer 22 in order to improve diffusibility of the fuel gas.

The catalyst layer 21 promotes a reaction of the hydrogen gas and the oxygen gas with a catalyst. The catalyst layer 21 includes the catalyst, a carrier that supports the catalyst, and an ionomer that coats the catalyst and the carrier.

Examples of the catalyst include metals such as platinum (Pt), ruthenium (Ru), iridium (Ir), rhodium (Rh), palladium (Pd) and tungsten (W), a mixture of these metals, an alloy of these metals, and the like. Among them, platinum, a mixture containing platinum, an alloy containing platinum and the like are preferable from viewpoints of catalytic activity, poisoning resistance to carbon monoxide, heat resistance and the like.

Examples of the carrier include a conductive porous metal compound having pores such as mesoporous carbon and Pt black. The mesoporous carbon is preferable from a viewpoint of having good dispersibility, a large surface area, and small particle growth at a high temperature even when a support amount of the catalyst is large.

As the ionomer, the polymer electrolyte having the same ion conductivity as that of the electrolyte membrane 1 can be used.

The gas diffusion layer 22 can uniformly diffuse the supplied fuel gas into the catalyst layer 21. As the gas diffusion layer 22, for example, a porous fiber sheet such as carbon fiber having conductivity, gas permeability, and gas diffusibility, and a metal plate such as foamed metal and expanded metal can be used.

The separator 4 is a plate on which a plurality of ribs 4b are provided on a surface thereof, and is also called a bipolar plate. Recesses 4a are provided on the surface of the separator 4 by the ribs 4b. The recess 4a forms a flow path of the fuel gas between the separator 4 and the MEA 3. This flow path is also a discharge path of water generated by the reaction of the fuel gas.

As a material for the separator 4, for example, in addition to carbon, a metal such as stainless steel is used.

The sub-gasket 5 is a film or plate provided at an end portion of the electrolyte membrane 1. Specifically, two frame-shaped sub-gaskets 5 are provided so as to sandwich the end portion of the electrolyte membrane 1 on an outer peripheral side of the catalyst layer 21. Such a sub-gasket 5 functions as a support body for the MEA 3 or a protective member of the end portion. Further, the sub-gasket 5 seals an inside of the fuel cell 10 by coming into contact with the separator 4 at an outer peripheral edge portion.

As a material for the sub-gasket 5, a resin having low conductivity can be used. The resin material is not particularly limited, and examples thereof include polyphenylene sulfide (PPS), polypropylene containing glass (PP-G), polystyrene (PS), a silicone resin, and a fluorine-based resin.

The fuel cell 10 can be manufactured by providing sub-gaskets 5 on outer periphery of the MEA 3 and then disposing the separators 4 on both sides of the MEA 3.
(Method for Manufacturing Membrane Electrode Assembly)

The MEA 3 can be manufactured by laminating the catalyst layers 21 on both surfaces of the electrolyte membrane 1 and further disposing a gas diffusion layer sheet on each catalyst layer 21 to form the gas diffusion layers 22.

The transfer sheet 50A can be used for laminating the catalyst layer 21. In this case, as the transfer layer 52 of the transfer sheet 50A, the catalyst layer 21 is formed on the base sheet 51.

FIG. 3 shows a processing procedure of laminating the catalyst layer 21 on the electrolyte membrane 1 using the transfer sheet 50A. FIGS. 4 and 5 show the catalyst layer 21 transferred to the electrolyte membrane 1.

As shown in FIG. 3, first, an ink for the surface layer 53 including the gas occlusion bodies 60 is applied on the base sheet 51, and the gas occlusion bodies 60 that store the gas are disposed (step S1). An ink for the catalyst layer 21 is applied on the surface layer 53 and the catalyst layer 21 is formed (step S2). Accordingly, as shown in FIG. 1, the transfer sheet 50A of the catalyst layer 21 is obtained.

The gas stored in the gas occlusion bodies (60) may be different between the anode side and the cathode side. For example, the gas occlusion body (60) that stores the hydrogen gas can be used to form the catalyst layer 21 on the anode side according to the supplied fuel gas. The gas occlusion body (60) that stores the oxygen gas or air can be used to form the catalyst layer 21 on the cathode side. Further, the gas occlusion body (60) that stores inert gas such as nitrogen gas, which has little influence on the chemical reaction of the fuel gas, may be used.

Next, the transfer sheet 50A is disposed on the electrolyte membrane 1. As shown in FIG. 4, the catalyst layer 21 on the base sheet 51 comes into contact with the electrolyte membrane 1 (step S3). The transfer sheet 50A and the electrolyte membrane 1 are pressurized and heated by hot press processing and the like, and the catalyst layer 21 is transferred to the electrolyte membrane 1 (step S4).

The transfer sheet 50A with the catalyst layer 21 being transferred is irradiated with infrared rays, and energy is applied thereto. Accordingly, the gas is released from the gas occlusion bodies 60 (step S5). The base sheet 51 is peeled off during the release of the gas (step S6). As shown in FIG. 5, since the gas enters between the base sheet 51 and the catalyst layer 21 due to the release of the gas, the base sheet 51 can be easily peeled off.

The energy is also applied by the pressurization and the heating during the transfer, and the energy applied for the gas release and the energy applied for the transfer may be the same or different. That is, the pressurization and the heating for the transfer before the peeling may function in the gas release as well as in the transfer, and the energy for the gas release during the peeling after the pressurization and the heating for the transfer may be further applied.

As described above, according to the present embodiment, the gas occlusion bodies 60 are disposed on the surface of the transfer layer 52 (catalyst layer 21), that is, between the transfer layer 52 (catalyst layer 21) and the base sheet 51, and the gas is released from the gas occlusion bodies 60 before or during the peeling of the base sheet 51. Since the transfer layer 52 (catalyst layer 21) and the base sheet 51 are easily separated by the gas, the peelability of the base sheet 51 can be improved regardless of the type of the base sheet 51.

Therefore, a general and inexpensive resin film such as an olefin resin film can be selected as the base sheet 51 instead of a special resin film such as a resin film having improved transferability or peelability. A work of selecting an optimum base sheet 51 for the transfer layer 52 (catalyst layer 21) becomes unnecessary, and a manufacturing cost can be reduced.

Since the peeling can be sufficiently performed even when the peeling force is small, damage to the transfer layer 52 due to the peeling force that is too strong can be reduced. Particularly, in the fuel cell 10, it is possible to reduce the occurrence of defects in the catalyst layer 21 due to the peeling of the base sheet 51, and it is possible to obtain excellent power generation performance. Therefore, the transfer sheet 50A is particularly suitable for the manufacture of the MEA 3.

Although a preferred embodiment of the invention has been described above, the invention is not limited to the embodiment.

For example, the gas occlusion bodies 60 may be disposed inside the transfer layer 52 as long as they do not interfere with a function of the transfer layer 52.

FIG. 6 shows a configuration example of a transfer sheet 50B in which the gas occlusion bodies 60 are disposed in the transfer layer 52.

The gas occlusion bodies 60 are preferably disposed on the base sheet 51 side. Gas from the gas occlusion bodies 60 is easily released to the base sheet 51 side, and peelability is improved. For example, the gas occlusion bodies 60 can be disposed on the base sheet 51 side by applying an ink for the transfer layer 52 including the gas occlusion bodies 60 and then applying an ink for the transfer layer 52 not including the gas occlusion bodies 60.

As the catalyst layer 21 has more voids communicating in a thickness direction, supply efficiency of the fuel gas and discharge efficiency of water increase, and the fuel cell 10 having high power generation efficiency can be provided. However, in the catalyst layer 21 formed by coating of the ink, resin components such as ionomer are easily fused when a coating film is dried, and the voids are easily closed. Therefore, the release of the gas may be used to form the voids.

Specifically, after the coating film of the catalyst layer 21 is formed on the base sheet 51, the catalyst layer 21 is transferred to the electrolyte membrane 1 before it dries. In addition, the gas is released from the gas occlusion bodies 60 in parallel with the transfer. The coating film dries due to pressurization and heating during the transfer, but the fusion of the resin is hindered by the gas, and the voids communicating in the thickness direction are likely to be formed inside the catalyst layer 21. Thereafter, by peeling the base sheet 51 while the gas is being released, the peeling becomes easy.

REFERENCE SIGNS LIST

50: Transfer sheet
51: Base sheet
52: Transfer layer
60: Gas occlusion body
10: Fuel cell
1: Electrolyte membrane
2: Electrode
21: Catalyst layer
22: Gas diffusion layer
4: Separator

The invention claimed is:

1. A transfer sheet (50A, 50B) comprising:
a transfer layer (52) laminated on a base sheet (51), and
a plurality of gas occlusion bodies (60) provided inside the transfer layer (52), wherein
the gas occlusion bodies (60) are configured to store gas, and release the stored gas when energy is applied, wherein the gas occlusion bodies (60) are porous glass beads.

2. The transfer sheet (50A, 50B) according to claim 1, wherein
the plurality of gas occlusion bodies (60) are arranged at different positions in an in-plane direction of the transfer layer (52).

3. The transfer sheet (50A, 50B) according to claim 1, wherein
the transfer layer (52) is a catalyst layer (21) included in an electrode (2) of a fuel cell (10).

4. The transfer sheet (50A, 50B) according to claim 1, wherein the gas occlusion bodies (60) are borosilicate glass beads.

5. A transfer method for transferring, from a transfer sheet (50A, 50B) in which a transfer layer (52) is laminated on a base sheet (51), the transfer layer (52) to an object to be transferred, the transfer method comprising:
a step of bringing the transfer sheet (50A, 50B) into contact with the object to be transferred to transfer the transfer layer (52); and
a step of peeling the base sheet (51), via the transfer layer (52), from the object to be transferred, wherein
the transfer sheet (50A, 50B) includes a plurality of gas occlusion bodies (60) that store gas inside the transfer layer (52), and
the method further comprising:
a step of applying energy to the gas occlusion bodies (60) before or during the peeling of the base sheet (51), so that the gas is released from the gas occlusion bodies (60), wherein the gas occlusion bodies (60) are porous glass beads.

6. A method for manufacturing a membrane electrode assembly (3) including electrodes (2) with catalyst layers (21) and an electrolyte membrane (1) with the electrodes (2) being disposed on both sides thereof, the method for manufacturing a membrane electrode assembly comprising:
a step of bringing a transfer sheet (50A, 50B) in which the catalyst layer (21) is laminated on a base sheet (51) into contact with the electrolyte membrane (1) to transfer the catalyst layer (21); and
a step of peeling off the base sheet (51) from the catalyst layer (21), wherein
the transfer sheet (50A, 50B) includes a plurality of gas occlusion bodies (60) that store gas inside the catalyst layer (21), and
the method for manufacturing a membrane electrode assembly further comprising:
a step of applying energy to the gas occlusion bodies (60) before or during the peeling of the base sheet (51), so that the gas is released from the gas occlusion bodies (60), wherein the gas occlusion bodies (60) are porous glass beads.

7. The transfer sheet (50A, 50B) according to claim 6, wherein the membrane electrode assembly (3) includes separators (4) disposed on both sides of the electrolyte membrane (1).

8. A fuel cell (10) comprising an electrode (2) having a catalyst layer (21), wherein the catalyst layer (21) is a transfer sheet according to claim 1.

9. The fuel cell (10) according to claim 8, wherein
the plurality of gas occlusion bodies (60) are arranged at different positions in an in-plane direction of the transfer layer (52).

* * * * *